United States Patent
Li

(10) Patent No.: US 9,983,723 B2
(45) Date of Patent: May 29, 2018

(54) PANEL DISPLAY DRIVING CIRCUIT AND TOUCH TIME ARRANGING METHOD

(71) Applicant: Raydium Semiconductor Corporation, Hsinchu (TW)

(72) Inventor: Hung Li, Taipei (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 39 days.

(21) Appl. No.: 15/206,629

(22) Filed: Jul. 11, 2016

(65) Prior Publication Data

US 2017/0038895 A1 Feb. 9, 2017

Related U.S. Application Data

(60) Provisional application No. 62/202,369, filed on Aug. 7, 2015.

(51) Int. Cl.
*G06F 3/041* (2006.01)

(52) U.S. Cl.
CPC .......... *G06F 3/0416* (2013.01); *G06F 3/0412* (2013.01)

(58) Field of Classification Search
CPC ...... G06F 3/0416; G06F 3/0412; G06F 3/044; G06F 2203/04803; G09G 2310/08; G09G 2330/02; G02F 1/13338

USPC .................................................. 345/173–174
See application file for complete search history.

(56) References Cited

U.S. PATENT DOCUMENTS

2016/0034060 A1* 2/2016 Lin ..................... G02F 1/13338
345/173

* cited by examiner

*Primary Examiner* — Amare Mengistu
*Assistant Examiner* — Gloryvid Figueroa-Gibson

(57) ABSTRACT

A touch time arranging method, applied to a panel display driving circuit having touch timing control function in a touch display panel, includes: dividing the resolution of touch display panel along a first direction by K touch regions of touch display panel along the first direction to obtain a first quotient; obtaining a digital combination including a first value I and a second value J closest to the integer part of first quotient; if the ratio of the number of occurrences of the first value and second value in the digital combination is X:Y, dividing the resolution by (I*X+J*Y) to obtain a second quotient; when the touch display panel displays R lines in order under a display mode, the touch display panel is switched to a touch mode every I lines and J lines alternately according to the digital combination to arrange a touch time to perform touch sensing.

8 Claims, 5 Drawing Sheets

PANEL DISPLAY DRIVING CIRCUIT AND TOUCH TIME ARRANGING METHOD

BACKGROUND OF THE INVENTION

1. Field of the Invention

This invention relates to display apparatus, especially to a panel display driving circuit and a touch time arranging method.

2. Description of the Prior Art

In the conventional touch display panel, the panel display driving circuit having touch timing control function needs to determine the time interval of driving touch regions according to the resolution and the number of touch regions of the touch display panel, so that the touch display panel can drive different touch regions in order after displaying every certain number of lines according to the time interval of driving touch regions to arrange a touch time during the blanking interval between displayed frames to perform touch sensing.

For example, as shown in FIG. 1, if the resolution of the touch display panel 1 is (1080*1920), namely the touch display panel 1 includes 1080 lines along the horizontal direction and 1920 lines along the vertical direction. If the touch display panel 1 is divided into 60 touch regions TA1~TA60 along the vertical direction, every time after the touch display panel 1 finishes displaying 32 lines, the touch display panel 1 will be switched to the touch mode to arrange a touch time during the blanking interval between displayed frames to perform touch sensing.

However, this time interval of driving touch regions will be limited by the GOA structure to be a multiple of a specific value (e.g., 8), as shown in FIG. 2, if the resolution of the touch display panel 2 is (1080*1920), namely the touch display panel 2 includes 1080 lines along the horizontal direction and 1920 lines along the vertical direction. If the touch display panel 2 is divided into 68 touch regions along the vertical direction, every time after the touch display panel 2 finishes displaying 24 lines, the touch display panel 2 will be switched to the touch mode. However, because 1920−(24*68)=288, after the touch display panel 2 is switched to the touch mode 68 times, there will be still a non-touch sensing region XA including 288 lines on the touch display panel 2. When the touch display panel 2 displays the 288 lines in the touch sensing region XA, the touch display panel 2 will not be switched to the touch mode to perform touch sensing. Obviously, this will make the touch sensing time distribution of the touch display panel 2 become uneven or excessive concentrated; as a result, the touch display panel 2 may fail to perform touch sensing in certain period of time and the touch sensing performance of the touch display panel 2 will be also seriously affected.

SUMMARY OF THE INVENTION

Therefore, the invention provides a panel display driving circuit and a touch time arranging method to solve the above-mentioned problems.

An embodiment of the invention is a touch time arranging method. In this embodiment, the touch time arranging method is applied to a panel display driving circuit having a touch timing control function in a touch display panel. A resolution of the touch display panel along a first direction is R and the touch display panel includes R lines, and the touch display panel is divided into K touch regions along the first direction, wherein R and K are positive integers. The touch time arranging method includes steps of: dividing the resolution R of the touch display panel along the first direction by the K touch regions of the touch display panel divided along the first direction to obtain a first quotient; obtaining a digital combination including a first value I and a second value J closest to an integer part of the first quotient, wherein the first value I and the second value J are both integer multiples of a specific value, the integer part of the first quotient is smaller than the first value I but larger than the second value J, I and J are positive integers; if a ratio of a number of occurrences of the first value I and the second value J in the digital combination is X:Y, dividing the resolution by (I*X+J*Y) to obtain a second quotient, wherein an integer part of the second quotient is N, X and Y are positive integers; and when the touch display panel displays the R lines in order under a display mode, switching the touch display panel to a touch mode every I lines and J lines alternately according to the digital combination to arrange a touch time to perform touch sensing.

In an embodiment, when the touch display panel displays the R lines in order under the display mode, a number of occurrences of the touch display panel switching to the touch mode and driving touch sensing electrodes is [(X+Y)*N].

In an embodiment, if X and Y are 1, after the touch display panel displays a first line through an I-th line of the R lines under the display mode, the touch display panel is first time switched to the touch mode to drive touch sensing electrodes and then switched back to the display mode, after the touch display panel displays a (I+1)-th line through a (I+J)-th line of the R lines, the touch display panel is second time switched to the touch mode to drive touch sensing electrodes and then switched back to the display mode.

In an embodiment, when the touch display panel displays the R lines in order under the display mode, a number of occurrences of the touch display panel switching to the touch mode and driving touch sensing electrodes every I lines is N.

In an embodiment, when the touch display panel displays the R lines in order under the display mode, a number of occurrences of the touch display panel switching to the touch mode and driving touch sensing electrodes every J lines is N.

In an embodiment, when the touch display panel displays the R lines in order under the display mode, a number of occurrences of the touch display panel switching to the touch mode and driving touch sensing electrodes is 2N.

In an embodiment, the specific value is 8.

In an embodiment, the second quotient is larger than or equal to N, and a product of N and (I*X+J*Y) is smaller than or equal to a largest positive integer of the resolution R.

Another embodiment of the invention is a panel display driving circuit. In this embodiment, the panel display driving circuit is applied to a touch display panel and having a touch timing control function. A resolution of the touch display panel along a first direction is R and the touch display panel includes R lines, and the touch display panel is divided into K touch regions along the first direction, wherein R and K are positive integers. The panel display driving circuit includes a first operation module, a comparing module, a second operation module and a driving module. The first operation module is configured to divide the resolution R of the touch display panel along the first direction by the K touch regions of the touch display panel divided along the first direction to obtain a first quotient. The comparing module is coupled to the first operation module and configured to obtain a digital combination including a first value I and a second value J closest to an integer part of the first quotient, wherein the first value I and the second value J are both integer multiples of a specific value, the integer part of the first quotient is smaller than the first value I but larger than the second value J, I and J are positive integers. The second operation module is coupled to the comparing module. If a ratio of a number of occurrences of the first value I and the second value J in the digital combination is X:Y, the second operation being configured to divide the resolution by (I*X+J*Y) to obtain a second quotient, wherein an integer part of the second quotient is N, X and Y are positive integers. The driving module is coupled to the comparing module and the second operation module. When the touch display panel displays the R lines in order under a display mode, the driving module switches the touch display panel to a touch mode every I lines and J lines alternately according to the digital combination to arrange a touch time to perform touch sensing.

Compared to the prior arts, the panel display driving circuit and the touch time arranging method of the invention use touch intervals having different staggered time lengths to prevent the touch sensing time distribution of the touch display panel from being uneven or excessive concentrated occurred in the prior art. Therefore, the touch sensing time distribution of the touch display panel can be more uniform in this invention without failing to perform touch sensing during certain period of time, and the touch sensing performance of the touch display panel of the invention can be effectively enhanced.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is a panel display driving circuit. In this embodiment, the panel display driving circuit having the touch timing control function is applied to a touch display panel, but not limited to this.

Figure 1:
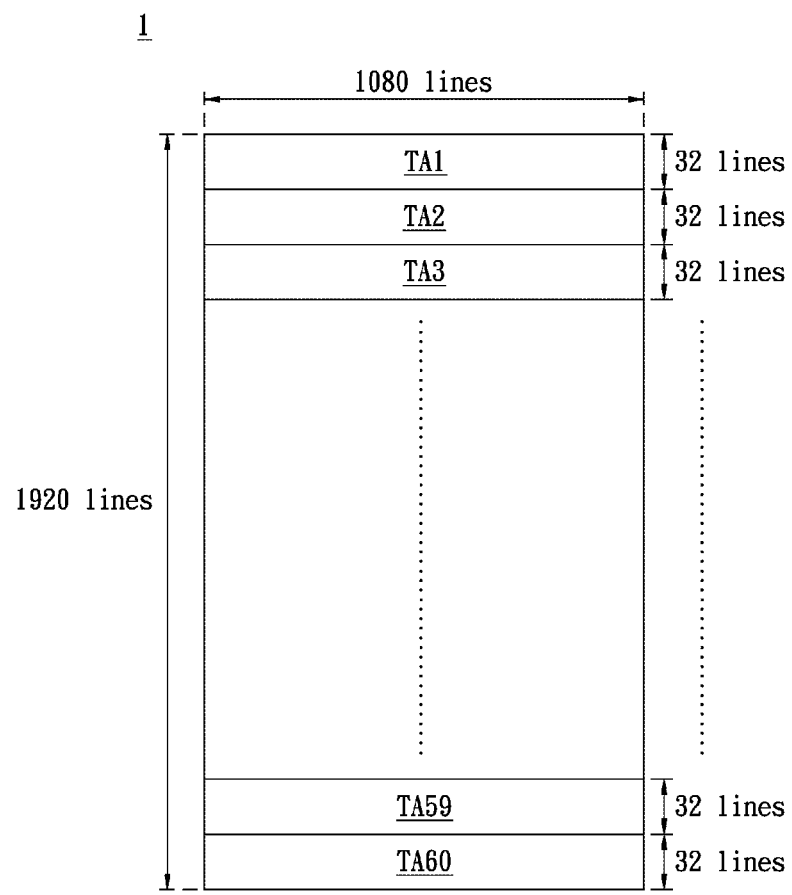
FIG. 1 illustrates a schematic diagram of the touch display panel being divided into 60 touch regions along the vertical direction.
Figure 2:
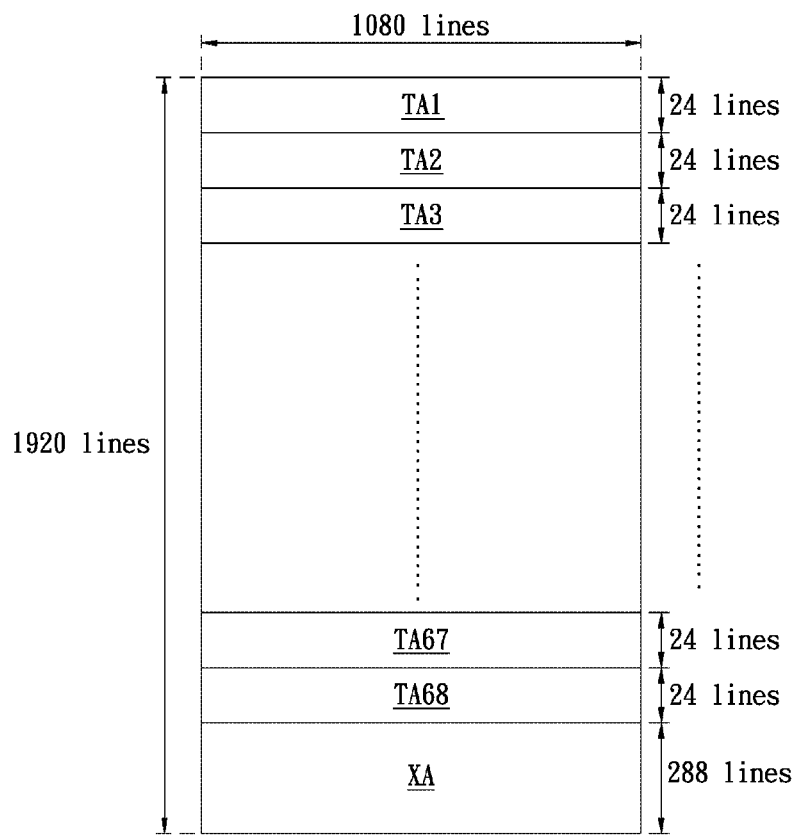
FIG. 2 illustrates a schematic diagram of the touch sensing time distribution of the touch display panel becoming uneven or excessive concentrated in prior art.
Figure 3:
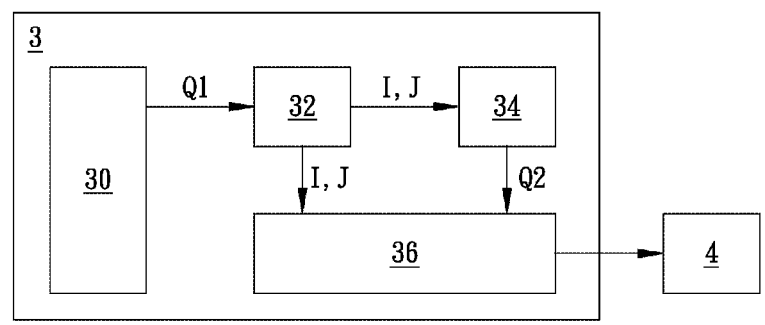
FIG. 3 illustrates a schematic diagram of the panel display driving circuit in a preferred embodiment of the invention.
Figure 4:
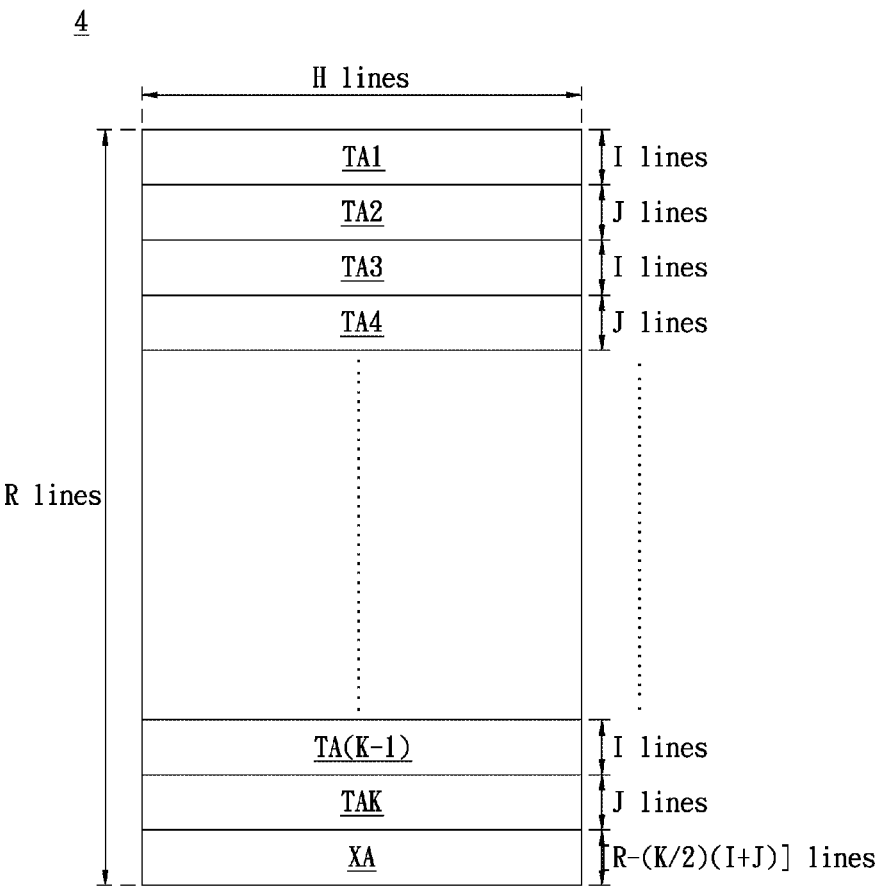
FIG. 4 illustrates a schematic diagram of the touch sensing time distribution of the touch display panel becoming more uniform by using touch intervals having different staggered time lengths.

Please refer to FIG. 3 and FIG. 4. FIG. 3 illustrates a schematic diagram of the panel display driving circuit in a preferred embodiment of the invention. FIG. 4 illustrates a schematic diagram of the touch sensing time distribution of the touch display panel becoming more uniform by using touch intervals having different staggered time lengths.

As shown in FIG. 3, the panel display driving circuit 3 is coupled to a touch display panel 4. The panel display driving circuit 3 includes a first operation module 30, a comparing module 32, a second operation module 34 and a driving module 36. Wherein, the comparing module 32 is coupled to the first operation module 30; the second operation module 34 is coupled to the comparing module 32; the driving module 36 is coupled to the comparing module 32, the second operation module 34 and the touch display panel 4 respectively.

As shown in FIG. 4, it is assumed that the resolution of the touch display panel 4 along the vertical direction is R and the touch display panel 4 includes R lines along the vertical direction; the resolution of the touch display panel 4 along the horizontal direction is H and the touch display panel 4 includes H lines along the horizontal direction. The touch display panel 4 is divided into K touch regions TA1~TAK along the vertical direction, wherein R and K are positive integers.

For example, if the resolution of the touch display panel 4 is (1080*1920), it means that the resolution of the touch display panel 4 along the horizontal direction is 1080 and the resolution of the touch display panel 4 along the vertical direction is 1920 respectively; that is to say, the touch display panel 4 includes 1080 lines along the horizontal direction and 1920 lines along the vertical direction respectively. Therefore, R=1920. In addition, the touch display panel 4 is divided into 68 touch regions along the vertical direction. Therefore, K=68.

It should be noticed that the resolution of the touch display panel 4 and the number of the touch regions along the vertical direction can be adjusted based on practical needs, but not limited to this.

In this embodiment, the first operation module 30 is used to divide the resolution R of the touch display panel 4 along the vertical direction by the number K of the K touch regions of the touch display panel 4 divided along the vertical direction to obtain a first quotient Q1. Based on the above-mentioned embodiment, since R=1920 and K=68, the first quotient Q1=1920/68=28.235.

Then, the comparing module 32 is configured to compare an integer part of the first quotient Q1 with an integer multiples of a specific value to obtain a digital combination which is closest to the integer part of the first quotient Q1, wherein the digital combination includes a first value I and a second value J, and the first value I and the second value J are both integer multiples of the specific value; the integer part of the first quotient Q1 is smaller than the first value I but larger than the second value J, wherein I and J are positive integers. Based on the above-mentioned embodiment, if the specific value is 8, since the integer part of the first quotient Q1 is 28, and 3* the specific value 8<the integer part 28 of the first quotient Q1<4* the specific value 8, it can be obtained that the first value I and the second value J of the digital combination closest to the integer part of the first quotient Q1 are 32 and 24 respectively.

If a ratio of a number of occurrences of the first value I and the second value J in the digital combination is X:Y, then the second operation 34 will divide the resolution R of the touch display panel 4 along the vertical direction by (X*the first value I+Y*the second value J) to obtain a second quotient Q2, wherein an integer part of the second quotient Q2 is N, X and Y are positive integers. It should be noticed that the second quotient Q2 will be larger than or equal to N, and a product of N and (I*X+J*Y) will be smaller than or equal to a largest positive integer of the resolution R.

Based on the above-mentioned embodiment, it is assumed that the ratio X:Y of the number of occurrences of the first value I and the second value J in the digital combination is 1:1. It means that X and Y are both 1 and the second quotient Q2=1920/(1*32+1*24)=34.444, and the integer part N of the second quotient Q2 is 34.

When the touch display panel 4 displays the R lines in order under a display mode, the driving module 36 will switch the touch display panel 4 to a touch mode every time after the touch display panel 4 finishes displaying I lines and J lines alternately according to the first value I and the second value J of the digital combination to arrange a touch time to perform touch sensing.

Based on the above-mentioned embodiment, as shown in FIG. 4, when the touch display panel 4 displays 1920 lines in order under the display mode, after the touch display panel 4 finishes displaying 32 lines, the driving module 36 will switch the touch display panel 4 to the touch mode to perform touch sensing and then switch the touch display panel 4 back to the display mode to display; then, after the touch display panel 4 finishes displaying another 24 lines, the driving module 36 will switch the touch display panel 4 to the touch mode again to perform touch sensing and then switch the touch display panel 4 back to the display mode to display, and so on.

In fact, when the touch display panel 4 displays the R lines in order under the display mode, the number of occurrences of the touch display panel 4 switching to the touch mode and driving touch sensing electrodes is $[(X+Y)*N]$. In this embodiment, the number $[(X+Y)*N]=(1+1)*34=68$.

If X and Y are 1, after the touch display panel 4 finishes displaying a first line through an I-th line of the R lines under the display mode, the touch display panel 4 is first time switched to the touch mode and the driving module 36 drives the touch sensing electrodes first time and then the touch display panel 4 is switched back to the display mode; after the touch display panel 4 finishes displaying a (I+1)-th line through a (I+J)-th line of the R lines, the touch display panel 4 is second time switched to the touch mode and the driving module 36 drives the touch sensing electrodes and then the touch display panel 4 is switched back to the display mode.

After the touch display panel 4 finishes displaying both the 32 lines and the 24 lines alternately for 34 times respectively, there will be a non-touch sensing region XA including $16[=1920-(32*34+24*34)]$ lines on the touch display panel 4. When the touch display panel 4 displays the 16 lines in the non-touch sensing region XA, the touch display panel 4 will not be switched to the touch mode to perform touch sensing. However, since the 16 lines of the non-touch sensing region XA is smaller than the first value 32 and the second value 24, there will no uneven or excessive concentrated touch sensing time distribution occurred in the touch display panel 4.

Therefore, the panel display driving circuit 3 can use touch intervals having different staggered time lengths to prevent the touch sensing time distribution of the touch display panel 4 from being uneven or excessive concentrated occurred in the prior art. Therefore, the touch sensing time distribution of the touch display panel 4 will be more uniform than that in the prior art.

Another embodiment of the invention is a touch time arranging method. In this embodiment, the touch time arranging method is applied to a panel display driving circuit having a touch timing control function in a touch display panel.

A resolution of the touch display panel along a first direction is R and the touch display panel includes R lines, and the touch display panel is divided into K touch regions along the first direction, wherein R and K are positive integers.

Figure 5:
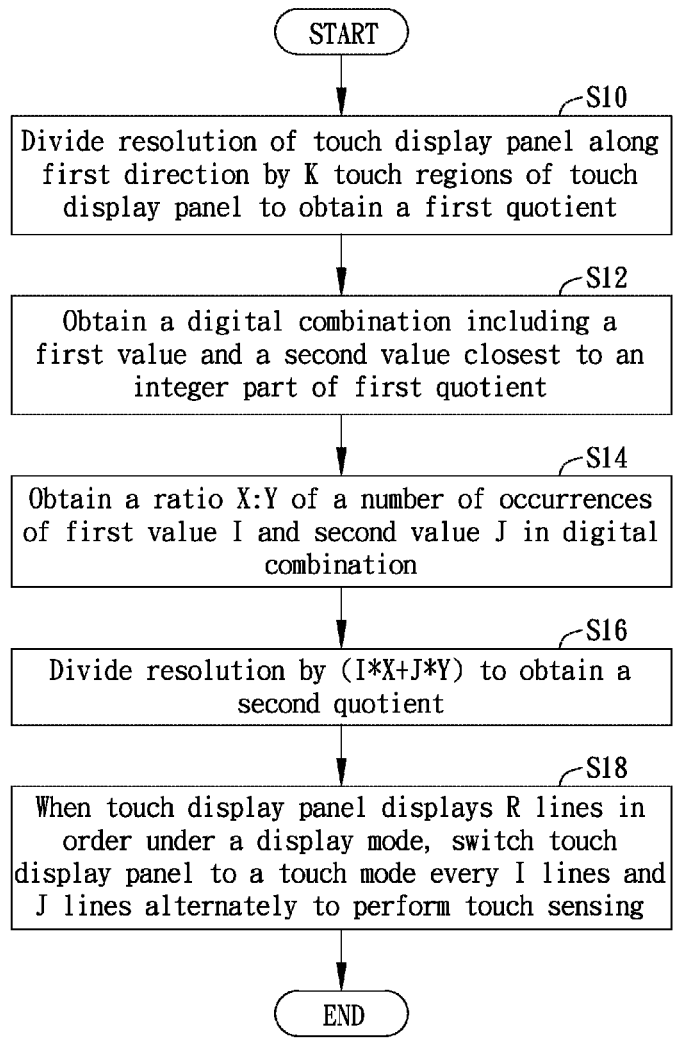
FIG. 5 illustrates a flowchart of the touch time arranging method in another embodiment of the invention.

Please refer to FIG. 5. FIG. 5 illustrates a flowchart of the touch time arranging method in another embodiment of the invention.

As shown in FIG. 5, the touch time arranging method includes the following steps:

Step S10: dividing the resolution R of the touch display panel along the first direction by the K touch regions of the touch display panel divided along the first direction to obtain a first quotient;

Step S12: obtaining a digital combination including a first value I and a second value J closest to an integer part of the first quotient, wherein the first value I and the second value J are both integer multiples of a specific value, the integer part of the first quotient is smaller than the first value I but larger than the second value J, I and J are positive integers;

Step S14: obtaining a ratio X:Y of a number of occurrences of the first value I and the second value J in the digital combination, X and Y are positive integers;

Step S16: dividing the resolution by $(I*X+J*Y)$ to obtain a second quotient, wherein an integer part of the second quotient is N;

Step S18: when the touch display panel displays the R lines in order under a display mode, the method switching the touch display panel to a touch mode every I lines and J lines alternately according to the digital combination to arrange a touch time to perform touch sensing.

In practical applications, the second quotient in step S16 is larger than or equal to N, and a product of N and $(I*X+J*Y)$ is smaller than or equal to a largest positive integer of the resolution R; the number of occurrences of the touch display panel switching to the touch mode and driving touch sensing electrodes in step S18 is $[(X+Y)*N]$.

In an embodiment, if X and Y are 1, after the touch display panel displays a first line through an I-th line of the R lines under the display mode, the touch display panel is first time switched to the touch mode to drive touch sensing electrodes and then switched back to the display mode, after the touch display panel displays a (I+1)-th line through a (I+J)-th line of the R lines, the touch display panel is second time switched to the touch mode to drive touch sensing electrodes and then switched back to the display mode.

When the touch display panel displays the R lines in order under the display mode, the number of occurrences of the touch display panel switching to the touch mode and driving touch sensing electrodes every I lines is N and the number of occurrences of the touch display panel switching to the touch mode and driving touch sensing electrodes every J lines is N; that is to say, the number of occurrences of the touch display panel switching to the touch mode and driving touch sensing electrodes is 2N.

Compared to the prior arts, the panel display driving circuit and the touch time arranging method of the invention use touch intervals having different staggered time lengths to prevent the touch sensing time of the touch display panel from being uneven or excessive concentrated occurred in the prior art. Therefore, the touch sensing time distribution of the touch display panel can be more uniform in this invention without failing to perform touch sensing during certain period of time, and the touch sensing performance of the touch display panel of the invention can be effectively enhanced.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A touch time arranging method, applied to a panel display driving circuit having a touch timing control function in a touch display panel, a resolution of the touch display panel along a first direction being R and the touch display panel comprising R lines, and the touch display panel being divided into K touch regions along the first direction, R and K being positive integers, the touch time arranging method comprising steps of:

dividing the resolution R of the touch display panel along the first direction by the K touch regions of the touch display panel divided along the first direction to obtain a first quotient;

obtaining a digital combination including a first value I and a second value J closest to an integer part of the first quotient, wherein the first value I and the second value J are both integer multiples of a specific value, the integer part of the first quotient is smaller than the first value I but larger than the second value J, I and J are positive integers;

dividing the resolution by (I*X+J*Y) to obtain a second quotient, wherein an integer part of the second quotient is N, X and Y are positive integers, and a ratio of a number of occurrences of the first value I and the second value J in the digital combination is X:Y; and when the touch display panel displays the R lines in order under a display mode, switching the touch display panel to a touch mode every I lines and J lines alternately according to the digital combination to arrange a touch time to perform touch sensing.

2. The touch time arranging method of claim 1, wherein when the touch display panel displays the R lines in order under the display mode, a number of occurrences of the touch display panel switching to the touch mode and driving touch sensing electrodes is [(X+Y)*N].

3. The touch time arranging method of claim 1, wherein X and Y are 1, after the touch display panel displays a first line through an I-th line of the R lines under the display mode, the touch display panel is first time switched to the touch mode to drive touch sensing electrodes and then switched back to the display mode, and after the touch display panel displays a (I+1)-th line through a (I+J)-th line of the R lines, the touch display panel is second time switched to the touch mode to drive touch sensing electrodes and then switched back to the display mode.

4. The touch time arranging method of claim 3, wherein when the touch display panel displays the R lines in order under the display mode, a number of occurrences of the touch display panel switching to the touch mode and driving touch sensing electrodes every I lines is N.

5. The touch time arranging method of claim 3, wherein when the touch display panel displays the R lines in order under the display mode, a number of occurrences of the touch display panel switching to the touch mode and driving touch sensing electrodes every J lines is N.

6. The touch time arranging method of claim 3, wherein when the touch display panel displays the R lines in order under the display mode, a number of occurrences of the touch display panel switching to the touch mode and driving touch sensing electrodes is 2N.

7. The touch time arranging method of claim 1, wherein the specific value is 8.

8. The touch time arranging method of claim 1, wherein the second quotient is larger than or equal to N, and a product of N and (I*X+J*Y) is smaller than or equal to a largest positive integer of the resolution R.

* * * * *